United States Patent [19]
Mukai et al.

[11] Patent Number: 5,773,906
[45] Date of Patent: Jun. 30, 1998

[54] BRUSH AND SLIP RING ARRANGEMENT OF AN AC GENERATOR

[75] Inventors: Takuzou Mukai, Handa; Kenzo Mitani, Obu, both of Japan

[73] Assignee: Nippondenso Co., Ltd., Kariya, Japan

[21] Appl. No.: 719,213

[22] Filed: Sep. 25, 1996

[30] Foreign Application Priority Data

Sep. 27, 1995  [JP]  Japan .................................. 7-248927

[51] Int. Cl.$^6$ .................................................. H02K 13/00
[52] U.S. Cl. ............................................. 310/232; 310/43
[58] Field of Search ..................................... 310/232, 219, 310/231, 235, 43

[56] References Cited

U.S. PATENT DOCUMENTS

| | | | |
|---|---|---|---|
| 740,166 | 9/1903 | McLauthlin | 310/232 |
| 1,460,031 | 6/1923 | Meyercordt | 310/232 |
| 4,406,961 | 9/1983 | Pfluger et al. | 310/232 |
| 4,447,752 | 5/1984 | Boyce et al. | 310/232 |
| 4,494,106 | 1/1985 | Smith et al. | 340/58 |
| 4,535,264 | 8/1985 | Allport | 310/232 |
| 4,733,143 | 3/1988 | Chitayat | 318/135 |
| 5,369,326 | 11/1994 | Strobl | 310/235 |

FOREIGN PATENT DOCUMENTS 5-130757   5/1993   Japan .

Primary Examiner—Steven L. Stephan
Assistant Examiner—B. Mullins
Attorney, Agent, or Firm—Cushman Darby & Cushman IP Group of Pillsbury Madison & Sutro LLP

[57] ABSTRACT

A slip ring is made of a carbonaceous material and a brush is made of a metal. A metal connection bar has an insert member held in the carbonaceous slip ring to make a mechanical and electrical connection without the necessity of an additional member. The slip ring and the connection bar are insert-molded in a slip-ring-support made of a resinous material. The slip-ring-support is press-fitted to a rear portion of the rotor so that the slip ring and the connection bar are fixed to the shaft at the same time. Further, the fan unit having a plurality of fan blades and a fan-supporting-portion is molded integrally with the slip-ring-support.

18 Claims, 7 Drawing Sheets

BRUSH AND SLIP RING ARRANGEMENT OF AN AC GENERATOR

BACKGROUND OF THE INVENTION

1. Field of the Invention

The present invention relates to a generator having a rotor core with a field coil wound thereon, to which electric current is supplied through a slip ring unit and a brush unit. More particularly, the present invention relates to such an alternator for use in a vehicle for charging a vehicle battery.

2. Description of the Related Art

A conventional alternator 100 has, as shown in FIG. 7, a three-phase rectifier 101, a voltage regulator 102 for regulating the output voltage, a housing 103, a shaft 104 rotatably supported by the housing 103, a stator 105 fixed to the inside of the housing 103, a rotor 106 which rotates inside the stator 105, a slip 107 secured to an end periphery of the shaft 104 and a brush unit 108 sliding on the outer periphery of the slip ring unit 107. The stator 105 is composed of a stator core 111 and three-phase stator coils 112, etc. The rotor 106 is composed of a Lund ell type pole core 113 and a field coil 114, etc., and the coil ends 115 of the field coil 114 are nearly covered by insulating tubes 116.

The slip ring unit 107 is composed of two metal slip rings 120 and two connection bars 121, etc. The two slip rings 120 are made of a copper alloy or stainless steel and rotate along with the shaft 104. The two connection bars 121 are electrically connected to the coil ends 115 and the two slip rings 120 respectively.

The brush unit 108 is composed of two brushes 131, a brush holder 132 which holds the brushes 131 and coil springs 133 which biases the brushes 131 against the outer periphery of the metal slip rings 120, etc. The brushes 131 are made of a carbonaceous material. The brushes 131 are connected to the voltage regulator 102 through brush terminals (not shown) by copper pig tails 134.

Recently, as the vehicle engine compartment has become smaller, the spaces for installing various devices has become smaller. In addition, restrictions in allowed fuel consumption has become severe and the warranty time of the vehicle has been extended. Consequently, a smaller and lighter vehicular alternator having a longer life time has been demanded. To make the alternator smaller and lighter, it is necessary to make the volume and the axial size of the vehicular alternator small.

In order to have a sufficient life time of the brushes, the brushes 131 are required to have an extra length in anticipation of the brush wear. However, the voltage drop of the field control circuit, which supplies the field current to the field coil 117, is made as small as posible to prevent the output voltage from decreasing. For this purpose, the brush holder 132 is disposed near the voltage regulator 102 which regulate the field current supplied to the field coil 117. As a result, the brushes 131 can not have sufficient length for the life time in the radial direction of the holder 124. Accordingly, the axial sizes of the brush holder 132 and the slip rings 120 are increased to occupy a large part of the total length of the vehicular alternator 100.

The brushes 131, which are made of a carbonaceous material, require a suitable contact area (size) and biasing force (spring force) of the coil springs 133 in order to reduce the electric resistance of the portions of the carbonaceous brushes in contact with the outer peripheries of the metal slip rings 120. Therefore, if the contact area of the brushes 131 is reduced in order to make the vehicular alternator 100 small, the current density increases thereby increasing the temperature of the brushes 131, reducing the life time thereof.

In a small DC rotary electric machine (e.g. motor), metal brushes made from laminated metal sheets or copper wires are used instead of the carbonaceous brushes and a rotating commutator made of a copper alloy. However, the commutator is worn away easily. Therefore, it is not suitable for such a highpower rotary machine as vehicular alternator.

As shown in FIG. 8, the coil ends 115 of the field coil 114 and the connection bar 121 are connected by welding or are fused together, after an exposed portion of the coil end 115 extending from an insulating tube 116 is inserted into a hole of the connection bar 121. The slip ring 120 and the connection bar 121 are connected by soldering.

An end of the insulating tube, the connecting portions of the coil end 115 and the connection bar 121 are covered by a resinous material (e.g. epoxy resin) to prevent bonding strength of the connecting portions from deteriorating due to a vibration of the connecting portion of the coil end and the connection bar 121 or vibration of the connecting portion of the slip ring 120 and the connection bar 121. The connecting portion of the slip ring 120 and the connection bar 121 is covered by an insulating member 124 which is press-fitted to or integrally molded with the shaft 104. The insulating member 124 is disposed in a longitudinally extending groove 117 to insulate the shaft 104, the slip ring 120 and the connection bar.

Because the slip ring 120 and the connection bar are soldered, it is necessary to provide a large space to accommodate a soldering tool when soldered, thereby increasing the axial and radial size of the slip ring 120.

U.S. Pat. No. 4,406,961 discloses an AC generator which has a brush made of a carbonaceous material, a carbonaceous slip ring and an insulating tube for insulating the coil end of the field coil. The tube is disposed in a groove formed axially in the shaft to connect the coil end of the field coil and the slip ring directly. The slip ring and the coil end of the field coil are soldered near the slip ring.

The slip ring may loosen when the layer of solder connecting the slip ring and the coil end cools down and shrinks. The soft layer of solder is not resistant to vibration, and the strength of the connecting portion of the coil end, and the slip ring may be deteriorated. Moreover, soldering of the slip ring and the coil end of the field coil necessitates working space for a soldering iron and a tool, thus increasing the size of the alternator.

SUMMARY OF THE INVENTION

It is an object, therefore, of the present invention has an object to provide an AC generator which has no such connecting wire which requires a large space for connecting work and which has a compact connecting portion for the slip ring and the connection bar. The connecting portion prevents loosening of the slip ring, improves resistance against vibration and improves durability.

For this purpose, an AC generator according to the present invention comprises connection bars having insert members insert molded with carbonaceous slip rings and a brush unit having brushes made of a metal member.

The carbonaceous slip ring has a self-lubricating function and a low coefficient of friction. The carbonaceous slip ring in combination with a metal brush ensures a stable electric current supply at a high speed within a stable wear rate. Because the brush made of metal reduces the electric resistance of the portion thereof interfacing with the outer periphery of the slip ring, the area of the brush portion can be made smaller without a resulting temperature rise in the brush, thereby increasing the life time of the brush.

Another object of the present invention is to provide an AC generator which has a molded fan and a ring supporting-portion disposed integrally with the fan, thereby reducing the number of molding dies and assembling time. When the unit of the ring supporting member integral with the fan is installed to the rotor core, the slip ring and the connection bar can be installed at the same time. Therefore, installing time of the fan unit, the ring supporting member, the slip ring and the connection bar can be reduced, thus reducing assembly costs.

Another object of the invention is to provide an AC generator in which the connection bar has a ring member insertmolded to the slip ring, thereby, increasing the strength of the slip ring and preventing excessive stress from being applied to the slip ring.

Another object of the invention is to provide an AC generator which has a connection bar having uneven or rough surface portions which are insert-molded within the slip ring to increase connecting strength between the slip ring and the connection bar.

Another object of the present invention is to provide a long life AC generator which has metal brushes with spring loads light enough to suppress vibration.

Another object of the present invention is to provide an AC generator which has an elastic member for connecting the brush and the outer connecting terminal thereby eliminating screws and rivets and making the brush light and compact.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

Figure 1:
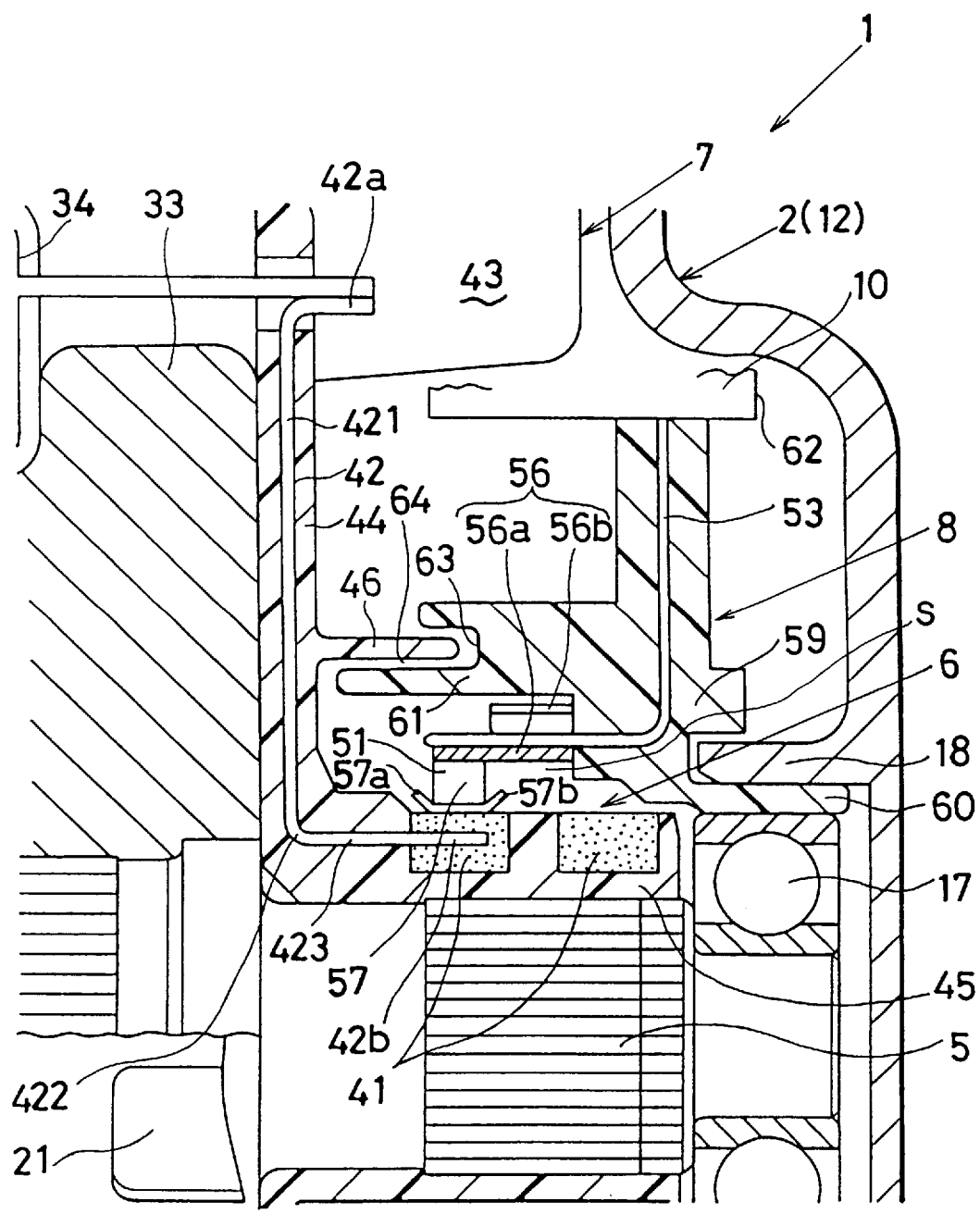
FIG. 1 is an enlarged partial plan view illustrating a main portion of the vehicular alternator according to a first embodiment of the present invention.
Figure 2:
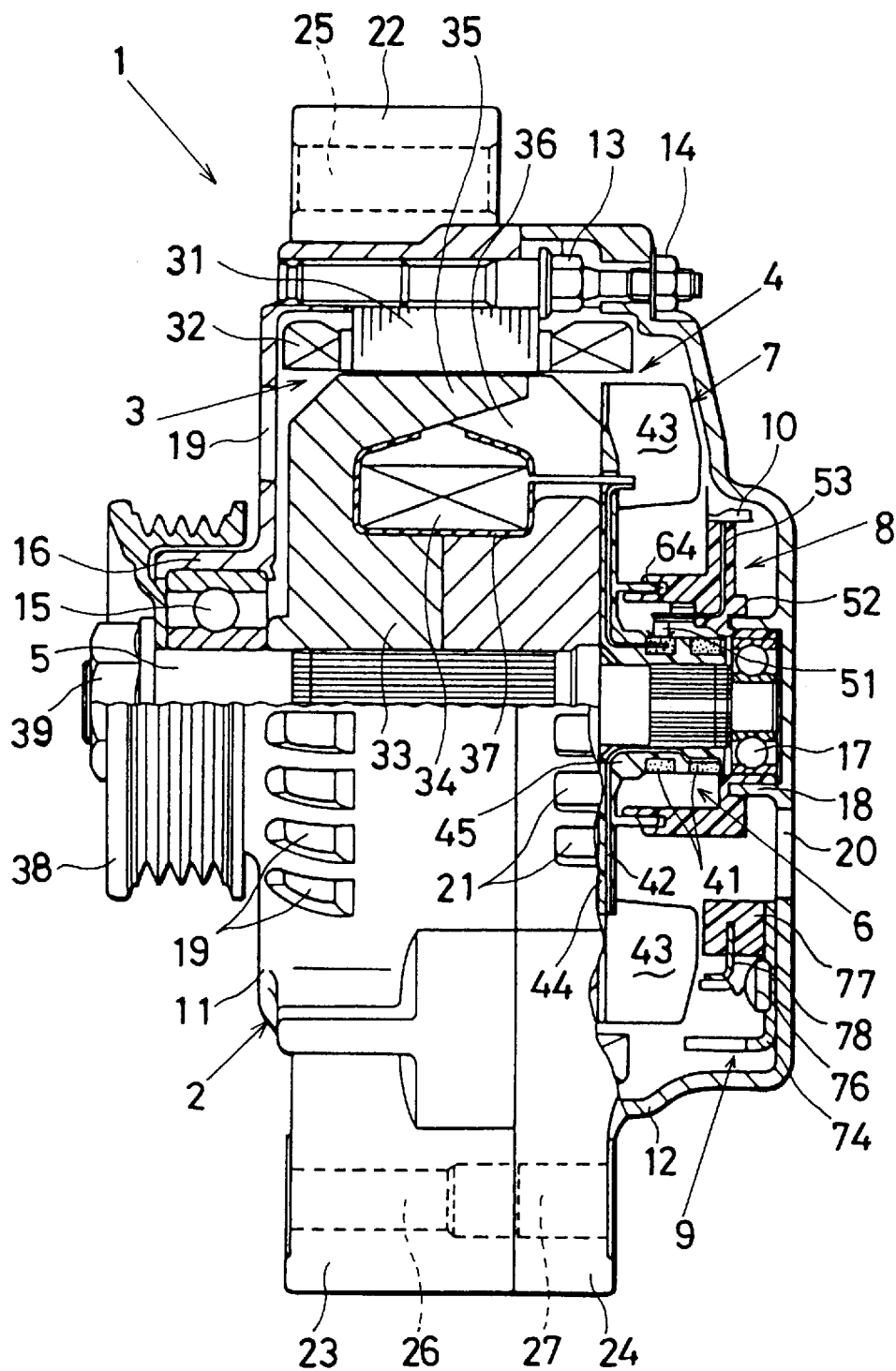
FIG. 2 is a cross-sectional view illustrating a vehicular alternator according to the first embodiment of the present invention.

DETAILED DESCRIPTION OF THE PREFERRED EMBODIMENTS (First Embodiment)

A first embodiment of the invention applied to a vehicular alternator is shown in FIGS. 1 to 5.

The alternator 1 is driven by an engine through a poly-V belt (not shown). AC current generated by the alternator is rectified by a three-phase rectifier 9 to DC current to charge a battery and energize electric loads. The alternator 1 is composed of a housing 2, a stator 3, a rotor 4, the slip unit 6, the brush unit 8, the three-phase rectifier 9 and the voltage regulator 10.

The housing 2 is composed of a front housing 11 and a rear housing 12, which are fastened by a plurality of stud bolts 13 and nuts 14. The front housing 11 has a front bearing 15 press-fitted or caulked to a boss portion 16 to rotatably support the front (head) portion of the shaft 5. The rear housing 12 has a rear bearing 17 press-fitted to a boss portion 18 to rotatably support the backward (rear) portion of the shaft 5. A number of air-intake holes 19 are formed annularly in the front housings 11 to introduce cooling air therein and also a number of air-intake holes 20 and air-outlet holes 21 are formed annularly in the rear housing 12. A stay 22 is formed integrally with an upper portion of the front housing 11 to be fixed to an upper bracket (not shown) of an engine and a stay 23 is formed integrally with a lower portion thereof to be fixed to a lower bracket (not shown) of the engine. A stay 24 is formed integrally with a lower portion of the rear housing 12 to be fixed to the lower bracket of the engine. These stays 22–24 have through holes 25–27 for bolts.

The stator 3 is composed of a stator core 31 secured to the inner periphery of the housing 2 and three-phase stator coils 32 wound around the stator core 31. The stator core 31 composes the armature core made of laminated sheets of a magnetic material and press-fitted to the inner periphery of the front housing 11. The stator core 31 has numbers of slots (not shown) formed at even intervals in the inner periphery thereof. The three-phase stator coils 32 are three-phase armature windings which are connected into the Y-connection or the Δ-connection to generate three-phase AC output power as the rotor 4 rotates. The coil ends of the stator coils 32 are soldered and connected to the three-phase rectifying circuit of the three-phase rectifier 9.

The rotor 4 is composed of the shaft 5, pole cores 33, a field coil 34 wound around the pole cores 33 and the slip unit 6 for supplying the field current to the field coil 34. The pole core 33 has a field coil 34 wound at the center thereof and made of a ferromagnetic material. The pole core 33 has claw poles 35 which become N-pole and other claw poles 36 which become S-pole when the field current is supplied to the field coil 34. A fan unit 7 is fixed to the rear surface of the claw poles 36 by welding or the like to take cooling air inside the housing 2. The field coil 34 is wound around the central portion of the pole core 33 via a coil bobbin and magnetizes the pole core 33 when the field current is supplied. The field coil 34 has opposite ends connected to connection bars 42 by soldering or the like. The coil bobbin 37 is made of an insulating resinous material to insulate the field coil 34 from the pole core 33.

The shaft 5 is rotatably carried by boss portions 16 and 18 of the housing 2 via the front and rear bearings 15 and 17.

A V-ribbed pulley 38 is fastened to an end of the shaft 5 between a washer-faced nut 39 and the front bearing 15 to transmit the engine rotational torque to the shaft 5. The V-ribbed pulley 38 is connected to and driven by a pulley for the poly V-belt carried by the engine output shaft through a poly V-belt (not shown). A magnet clutch can be disposed between the shaft 5 and the V-ribbed pulley 38.

Figure 4:
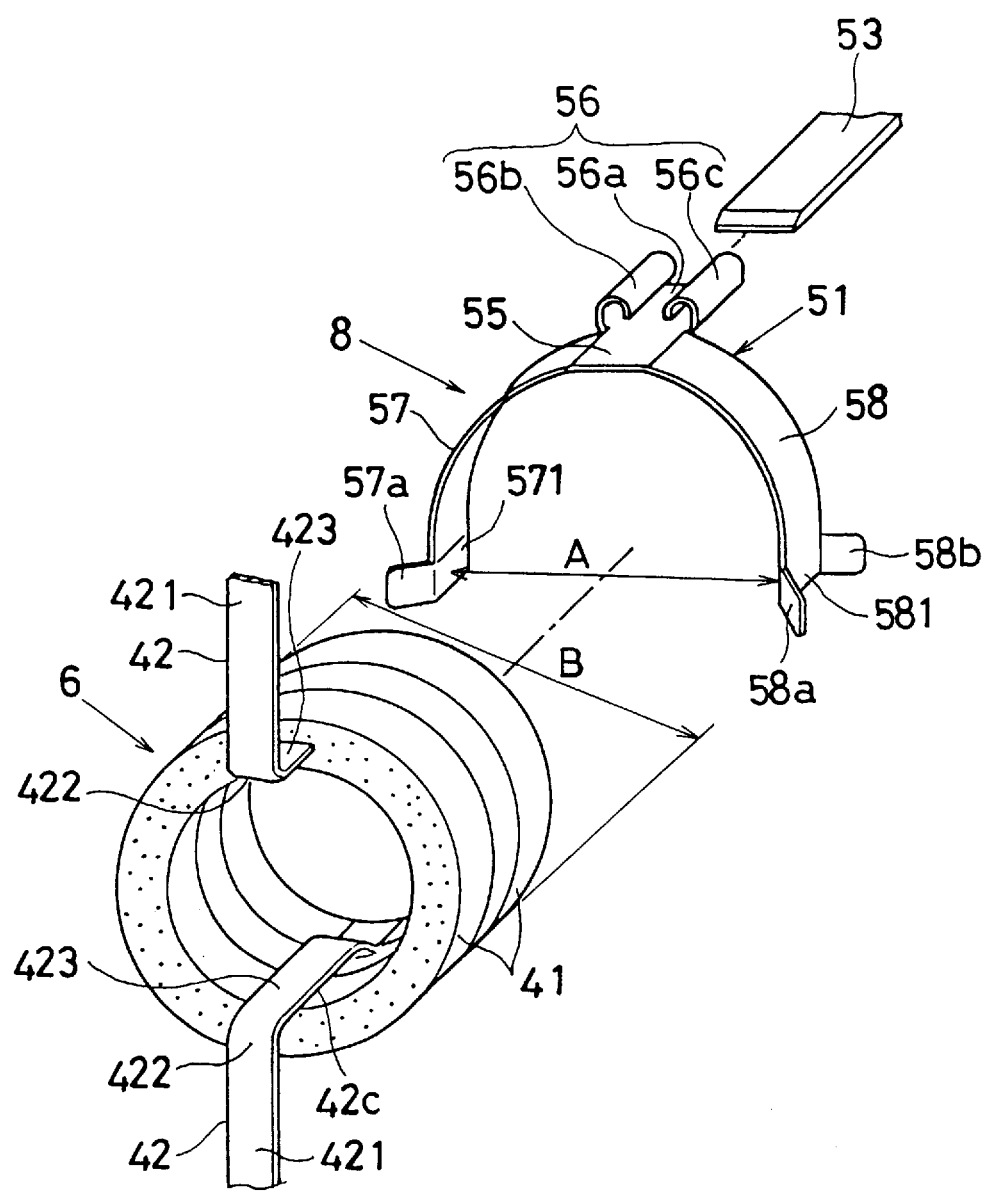
FIG. 4 is an exploded perspective view illustrating a slip ring and a brush unit according to the first embodiment of the present invention.

FIG. 4 illustrates a slip unit 6 and a brush unit 8.

The slip ring unit 6 is composed of two carbonaceous slip rings 41 connecting the battery, the voltage regulator 10 and the field coil 34 through the brush unit 8 and two connection bars 42 connected to the slip rings 41. The slip rings 41 are disposed on the rear portion of the outer periphery of the shaft 5. These slip rings 41 are made of perforated copper alloy as a body structure with carbonaceous powder such as carbon, natural graphite or electric graphite impregnated therein. Each of the slip rings 41 is formed together with one of the connection bars 42. Because the slip rings 41 are made of a carbon material which has self-lubricity to reduce the friction coefficient and reduced possibility of contact with the brushes 51, the wear rate is reduced drastically as compared with the conventional metal slip rings.

Figure 5:
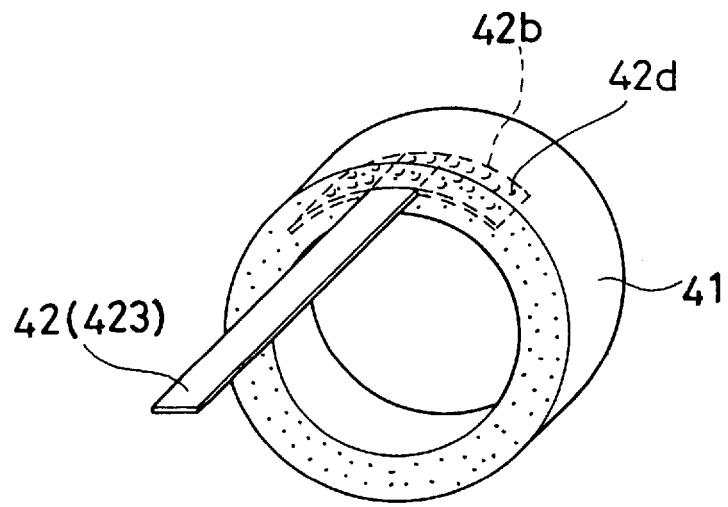
FIG. 5 is a perspective view illustrating the slip ring and a connection bar connected to one another in accordance to the first embodiment of the present invention.

Each of the connection bars 42 is formed from a flat plate by pressing to have a radial member 421 extending in the radial direction of the shaft 5 and an axial member 423 extending backward from a bent portion 422 extending in parallel with the axis of the shaft 5. An end of each of the radial member 421 has a bent terminal portion 42a, which is electrically connected to a coil end of the field coil 34 by soldering or fusing (resistant welding) as shown in FIG. 1. The rear portion of the axial member 423 has an insert member 42b which is insert-molded in and mechanically and electrically connected to the slip ring 41 as shown in FIGS. 4 and 5. The upper and lower surfaces of the insert member 42b are roughed up to form uneven surfaces 42d by shot-blasting, shot-peening or press-forming to increase contacting surfaces, thereby decreasing the electric resistance of connection of the slip ring 41 and the connection bar 42.

Therefore, an additional space for connecting the slip ring and the connection bar 42 is not necessary and the connecting portion of the slip ring 41 and the insert member 42b can be made small. The insert-molding of the connection bar into the slip ring 41 prevents loosening of the slip ring 41 and improves the vibration resistance of the portion connecting the slip ring 41 and the insert member 42b.

One of the axial members 423 which is connected to the rear slip ring has a bridge portion 42c to avoid interference with the front slip ring 41.

The fan unit 7 is formed of an insulating resinous material to be integral with the slip rings 41 and the connection bars 42. The fan unit 7 protects the connecting member connecting the slip rings 41 and the field coil 34. The fan unit 7 is composed of a plurality of centrifugal fan blades 43, an annular fan-supporting-portion 44 supporting the fan blades 43 and a cylindrical slip-ring-support 45 which is insert-molded to be integral with the slip rings 41. The supporting-portion 44 is fixed to the rear wall of the pole core 33 and holds the radial members of the connection bars 42 therein. The supporting-portion 44 has an annular projecting portion 46 facing the brush unit 8. The slip-ring-support 45 is formed to be integral with the slip rings 41 and the axial members of the connection bars 42 by an insulating resinous material, and is press-fitted to the outer periphery of the rear side of the shaft 5. The ring-support 45 can be molded integrally with the shaft.

The insulating resinous material is a material which has high heat resistance, high strength and high dimensional stability such as a phenolic resin, that is polyphenylene sulfide (PPS), nylon (PBT), etc.

The integration by an insulating resinous material of the fan blades of the fan unit 7, supporting-portion 44 and the slip-ring-support 45 makes one molding die mold the fan unit 7 and the slip-ring-support 45 at the same time, thereby reducing the number of molding dies.

The slip rings 41 can be fixed to the shaft 5 when the slip-ring-support 45 is press-fitted to or molded together with the outer periphery of the shaft 5. The connection bars 42 can be also fixed to the outer periphery of the shaft 5. Accordingly, installation time of them to the rotor 4 can be reduced so that the production cost of the vehicular alternator 1 can be reduced.

Because the slip-ring-support 45 cover most of the slip ring 41 and the insert member 42b of the connection bar 42, the connecting strength of the connecting portion of the slip ring 41 and the insert member 42b last for a long time. In addition, electric insulation of the slip rings 41 and the connection bars 42 from the shaft and other parts can be carried out at the same time and, therefore, connection of the slip ring 41 and the insert member 42b can be maintained in normal condition.

Figure 3:
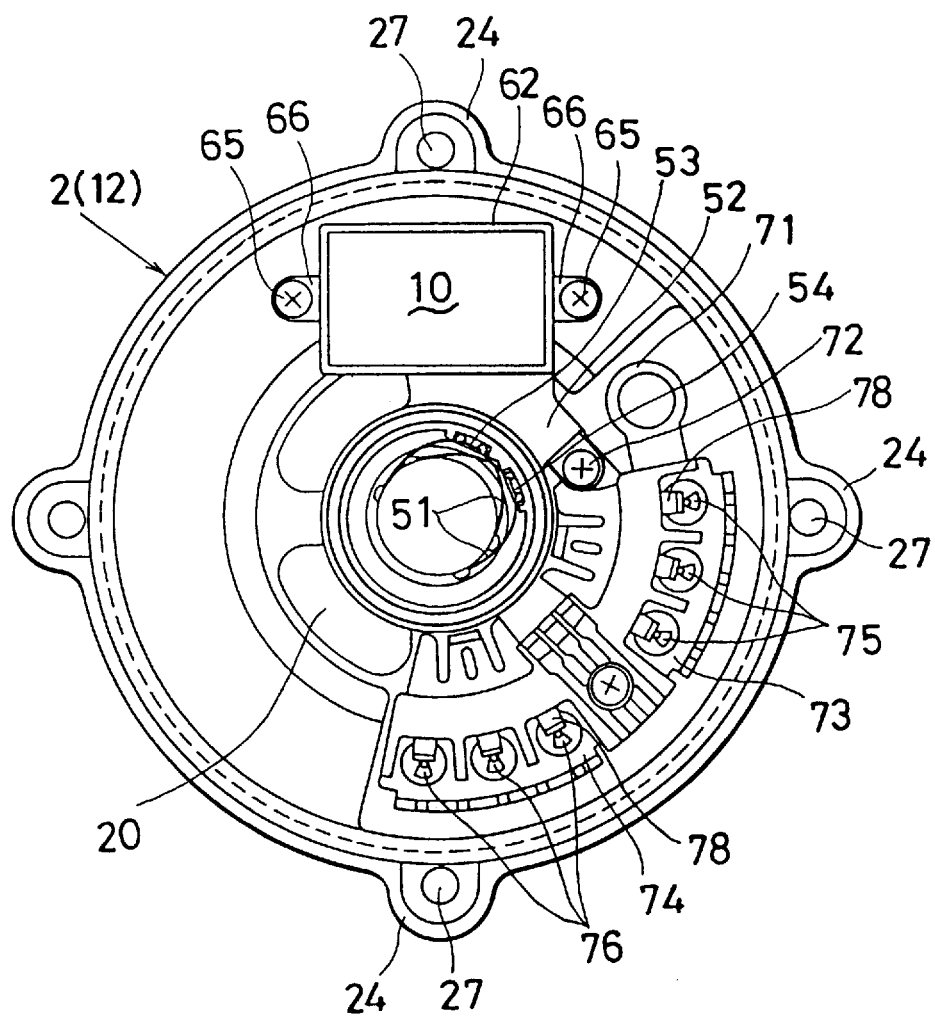
FIG. 3 is an end view illustrating a rear housing with a three-phase rectifier, voltage regulator and a brush unit according to the first embodiment of the present invention.

The brush unit 8 is composed of two metal brushes 51 sliding on the outer periphery of the slip rings 41, the brush holder 52 fixed to the housing 2 for supporting and holding the brushes 51 and the connecting terminals 53 and 54 insert-molded in the brush holder 52. The connecting terminals 53 and 54 are disposed to be spaced apart from each other on a circumferential line around the slip rings 41 as shown in FIG. 3.

The brushes 51 are made by stamping or press-forming an elastic laminated sheets of springy copper alloy such as phosphor bronze or beryllium. Because the brushes 51 are made of a conductive metal member, the portions of the brushes in contact with the slip rings 41 can be reduced without sacrificing the conductivity so that temperature rise of the brushes 51 can be restrained, thereby, to elongate the life time of the brushes 51.

Although the slip rings 41 are made of a carbonaceous material, the portions of the slip rings 41 in contact with the brushes 51 are a small part of the entire periphery of the slip rings 41, and the temperature rise is not significant, thereby elongating the life time of the slip rings 41.

Each of the brushes 51 has a brush body 55 and clamp portion 56 extending axially backward from the brush body 55 to the brush holder 52. The brush body 55 has two arms 57 and 58 extending from both sides thereof to be in contact with the outer periphery of the slip ring 41. Each of the two arms 57 and 58 is formed into a semicircular shape (horseshoe shape) as shown in FIG. 4 to press against one of the slip rings 41 by the shrink due to the difference (B–A) distance between the two contact members 571 and 581 (between the arm distance) A and the diameter B of the slip ring 41. The contact members 571 and 581 are disposed to slide on the outer periphery of the slip rings 41 at a contact pressure provided by its own elasticity.

As shown in FIGS. 3 and 4, the brush body 55 of the brushes 51 is formed into a semicircle to hold the slip rings in the two contact members 571 and 581. Therefore, the composite vector of the contact pressures of the brushes 51 applied to the outer periphery of the slip rings 41 becomes zero so that no contact pressure is applied to the clamp portion 56 which is mechanically fixed to the connecting terminals 53 and 54. If an excessive vibration is generated in a direction where the brush body 55 of the brushes 51 leaves the slip rings 41, that is, the radial direction of the slip rings 41, the leaving contact members 571 (581) and the staying contact member 581 (571) assure the electric connection of the brushes 51 and the slip rings 41, thereby supplying stable field current to the field coil 34.

The four projections 57a, 57b, 58a and 58b extend axially in both directions and bent radially outward from the contact members 571 and 581 (chamfered). Therefore, they can move smoothly in the axial direction so that installation and removal of the brushes 51 become easy. The clamp portion 56 is electrically and mechanically fixed to the connecting terminals 53 and 54 in a manner to utilize the spring characteristic. As shown in FIG. 4, the clamp portion 56 has the projection 56a axially extending from the base portion (top portion) 55a of the brush body 55 and clamp members 56b and 56c which are curled to form a elliptic cylinder having deformable elasticity. The clamp portion 56 holds each edge portion of the connecting terminals 53 and 54 by the projection 56a and the clamp members 56b and 56c so that each of the brushes 51 is spaced apart from each other in the axial direction to be in contact with a corresponding one of the slip rings 41. Thus, the brush 51, particularly, the brush body 55 becomes compact and requires a small spring force so that the wear rate thereof becomes drastically small. Therefore, even if the voltage regulator 10 is disposed near the brushes 51, the diameter of the vehicular alternator 1 can be reduced and the length thereof can be also reduced.

When the connecting terminals 53 and 54 are molded integrally with the brush holder 52, the connecting terminals 53 and 54 and the clamp portion 56 are mechanically connected after molding, thereby to prevent decrease in the wear resistance of the brushes 51 due to temperature rise during the insert molding.

The resistance of the vibration is generally expressed as follows according to a machine design book.

$$\text{Resistance of Vibration} \propto \{(k \times \text{spring load})/(\text{weight of brushes})\} + \{\text{weight of spring}\} \qquad [\text{Eq. 1}]$$

Therefore, if the weight of the brushes (brush body) is reduced, the spring load of the brushes can be reduced. As a result, the brushes 51 can slide on the outer periphery of the slip rings 41 at a high speed (e.g. not lower than 10,000 rpm), ensuring stable wear and electric power supply and a sufficient life time of the brushes 51 and the slip rings 41.

The brush holder unit 52 has an integral mold unit of a brush holder 59, a bearing support 60, a cylindrical extension 61 extending axially from the front portion of the brush holder 59 and a casing 62 of the voltage regulator 10 which is described later. The brush holder 59 is molded by an insulating resinous material and holds the connecting terminals 53 and 54 integrally so that the ends of the connecting terminals extend to opposite directions respectively. The bearing support 60 supports the rear bearing 17 and the outer periphery thereof is press-fitted to the inner periphery of the boss 18 of the rear housing 12. Thus, the brush holder 59 and the bearing support 60 are formed in a unit to receive the rear bearing therein so as to eliminate a gap which is otherwise formed between the brush holder and the rear housing.

The cylindrical extension 61 and the fan unit 7 enclose the slip rings 41, the brushes. The extension 61 is provided with an annular groove 63 on the surface facing the fan-supporting-portion 44 and receives the annular projecting portion 46.

As a result, the annular groove 63 and the annular projecting portion 46 form a labyrinth seal 64 closing the space S accommodating the brushes 51 and the slip rings 41.

The connecting terminal 53 has an L-shaped cross-section and is formed integrally with a field current output terminal (not shown) of the voltage regulator 10. The connecting terminal 54 has an inverted L-shaped cross-section so as to extend in the direction opposite to the connecting terminal 53. It is connected to a DC output terminal 71 of the three-phase rectifier 9 by a fixing screw 72. The edge portions of the connecting terminal 53 and 54 are tapered so that they are inserted into a space between the projection 56a of the clamp portion 56 and clamp members 56b and 56c. The terminals 53 and 54 are made of a metal such as an aluminum alloy or a copper alloy.

The three-phase rectifier 9 is composed of the DC output terminal 71, plus-side cooling fin 73 minus-side cooling fin 74, three plus-side diodes 75, three minus-side diodes 76 and a terminal support 77. The plus-side cooling fin 73 is formed integrally with the minus-side cooling fin 74 so that they surround the brush holder 52 and is disposed along the side wall of the rear housing 12. The plus-side cooling fin 73 is fixed to the inner side wall of the rear housing 12 via an insulating member (not shown). The minus side cooling fin 74 is body-earthen (grounded)through the rear housing 12.

The terminal support 77, which is made of an insulating resinous material (e.g. PPS), has the three AC input terminals 78 molded integrally therewith and insulates the plus-side cooling fin 73 from the minus-side cooling fin 74.

The voltage regulator 10 is composed of various outer connecting terminals (not shown) such as the field current output terminal, an integrated circuit (not shown) and a casing 62. The field current output terminal is molded to be integral with a metal member such as a copper alloy and held by the casing 62 and mechanically connected the brushes 51.

The casing 62 is made of an insulating resinous material (e.g. PPS) and is integral with the brush holder unit 52. It has brackets 66 fixed to the rear housing 12 by screws 65. That is, the casing 62 holds the brush holder unit 52 and the brushes 51 in the rear housing 12 and accommodates electric parts including an integrated circuit therein, which is molded with an epoxy resin. Therefore, the number of molding dies is reduced to one and no additional space for fastening the casing by screws or welding is necessary.

When the rotor is rotated by an engine and the cooling air is taken into the housing 2, foreign particles such as water or dust may be ingested together. Especially if such foreign particles are ingested into the rear housing 12 through the air intake holes 20, the particles may reach to the interface of the slip rings 41 and the stator-side housing. However, the cylindrical space S, where the interface of the slip rings 41 and the brushes 51 is disposed, is sealed by the labyrinth seal 64.

On the other hand, powder produced in the space S due to the friction of the slip rings 41 and the brushes 51 is prevented from escaping the space S.

The generating operation of the vehicular alternator 1 is well known and, therefore, omitted.

[Second Embodiment]

Figure 6:
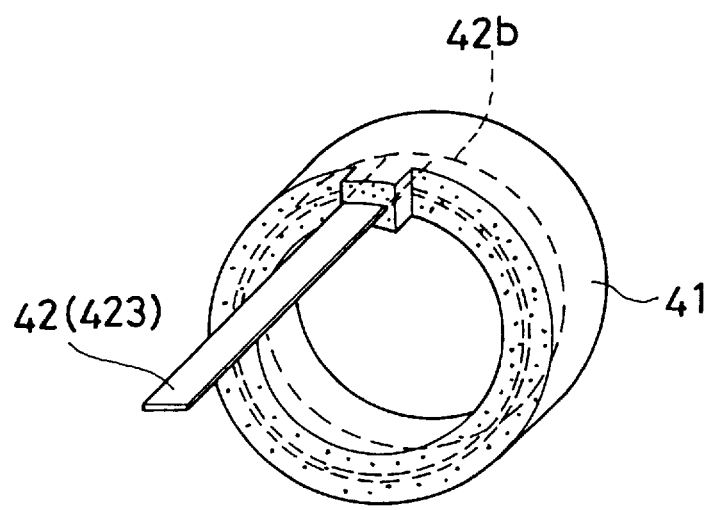
FIG. 6 is a perspective view illustrating the slip ring and a connection bar connected to one another in accordance to a second embodiment of the present invention.
Figure 7:
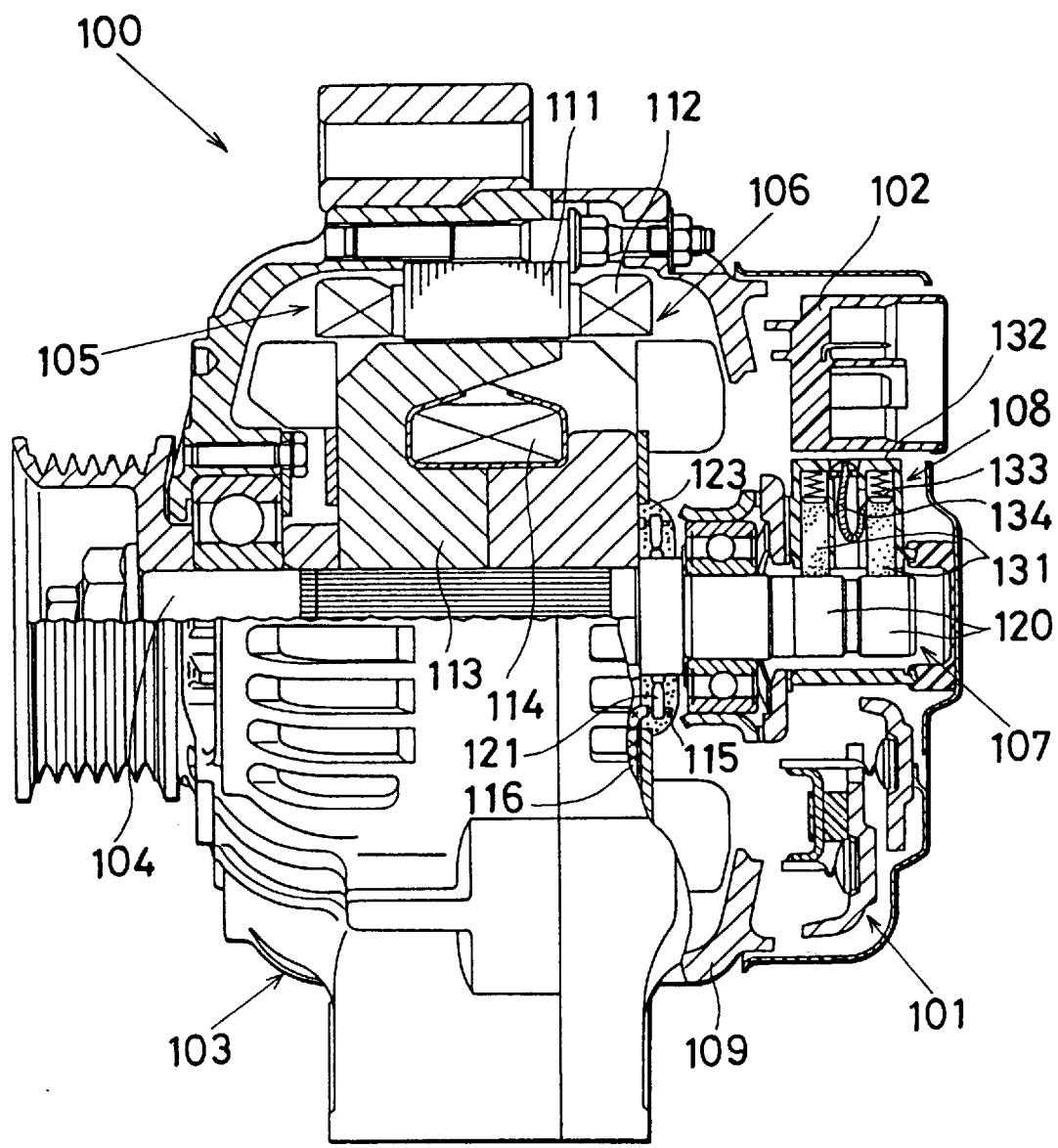
FIG. 7 is a cross-sectional view illustrating a conventional alternator for a vehicle (prior art)
Figure 8:
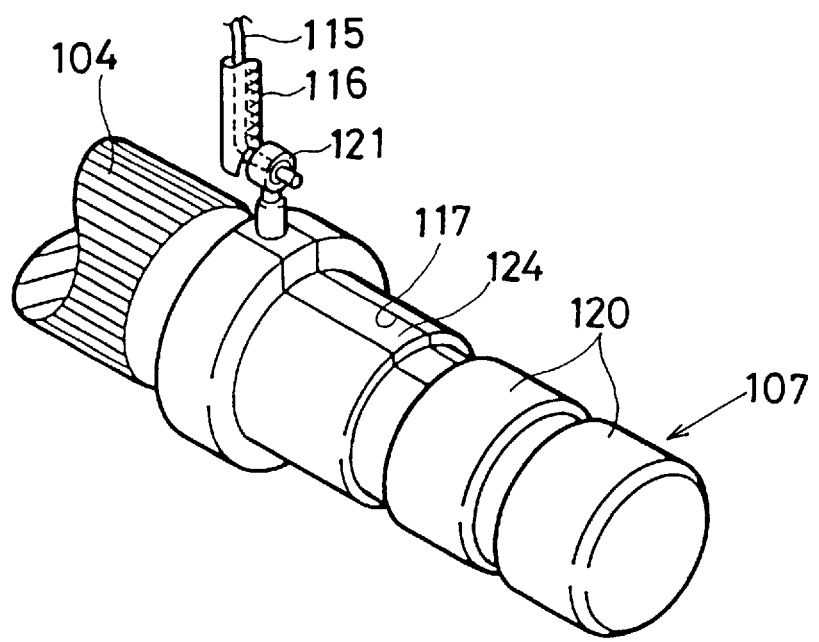
FIG. 8 is a perspective view illustrating a slip unit of a conventional alternator for a vehicle. (prior art).

As shown in FIG. 6, the insert member 42b of the axial member 423 of the connection bar 42 is formed into a ring. Further, the projecting axial member 423 is thickened.

Accordingly, the contacting area and connecting strength of the slip ring 41 and the connection bar 42 is considerably increased as compared with the first embodiment.

When the slip ring 41 and the connection bar 42 are insert-molded in the slip-ring-support 45 with a resinous material, an injection mold pressure (e.g. 3 kgf/cm² in case of PPS and PBT) is applied to the ring-shaped insert member 42b in the slip ring 41. That is, the insert member 42b lessens the pressure applied to the carbonaceous slip ring 41 to about 1/10.

The rough upper and lower surfaces of the insert member 42b are formed by shot-blasting, shot-peening, or press-forming to increase the area of the insert member in contact with the slip ring 41 and to reduce the electric resistance.

[Variation]

Although the description of the above embodiment is made with reference to the vehicular alternator, the embodiment can be applied to a stationary AC generator for an electric power station of a building. It can be applied to a generator-motor also.

The shaft 5 can be connected to the output shaft of the engine directly. In this case, the pulley is omitted. A gear transmission having more than one power converting stage such as a gear transmission or a V-belt-type non-stage transmission can be connected between the shaft 5 and the engine. The shaft 5 can be driven by a motor also.

The pig-tails can be integrally formed with each of the brushes and a separate spring can be used.

The fan blades 43, the fan-supporting-portion 44 and the slip-ring-support 45 can be formed separately. Further, the fan blades 43 or the supporting-portion 44 can be made of a metal and insert-molded with the slip rings with a resinous material.

The brush holder unit 52, the casing of the voltage regulator 10 and the bearing support (bearing holder) 60 can be formed separately. It is possible that only the brush holder unit 52 and the voltage regulator 10 are combined in a unit.

The fan unit 7 and the fan blades 43 can be replaced by an axial fan. It is possible to install the slip unit 6, the fan unit 7 and the brush unit 8 inside the front housing 11, that is, in front of the pole core 33 in the housing 2.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What we claim is:

1. A brush and slip ring arrangement of an AC generator which includes a housing, a stator having a stator coil, a rotor having a shaft, a field coil and a rotor core for rotating relative to said stator, wherein said arrangement comprises:
    a slip ring unit carried by said shaft and having a cylindrical insulating member and a pair of carbonaceous slip rings held in said cylindrical insulating member, each of said carbonaceous slip rings being composed of a conductive body structure impregnated with carbon power;
    a pair of brush members made of springy copper alloy disposed to slide on said carbonaceous slip rings;
    a brush holder unit fixed to said housing for holding said brush members; and
    a pair of connection bars electrically connecting said field coil and said carbonaceous slip rings, each of said connection bars having an insert member at one end thereof insert-molded with said conductive body structure of one of said carbonaceous slip rings, thereby ensuring both mechanical and electrical connection.

2. A brush and slip ring arrangement as claimed in claim 1, wherein each of said connection bars comprises a conductive metal plate.

3. A brush and slip ring arrangement as claimed in claim 2, wherein each said insert member has uneven surfaces to increase strength of connection of said slip ring and said connection bar.

4. A brush and slip ring arrangement as claimed in claim 1, where each said insert member has an arc portion extending in a circumferential direction of a corresponding one of said slip rings.

5. A brush and slip ring arrangement as claimed in claim 1, wherein each said insert member has a ring portion extending in a circumferential direction of a corresponding one of said slip rings.

6. A brush and slip ring arrangement as claimed in claim 1, wherein each of said connection bars extends axially from an end of a corresponding one of said slip rings.

7. A brush and slip ring arrangement as claimed in claim 1, wherein said slip ring unit and said connection bars are disposed integrally with said rotor by an insulating resinous material.

8. A brush and slip ring arrangement as claimed in claim 7, wherein said slip ring unit is secured to said shaft by said insulating resinous material.

9. A brush and slip ring arrangement as claimed in claim 8, wherein each of said connection bars comprises a conductive metal plate.

10. A brush and slip ring arrangement as claimed in claim 8 wherein said AC generator further comprises a fan formed of said insulating resinous material integrally with said rotor disposed between said rotor core and said slip ring unit.

11. A brush and slip ring arrangement as claimed in claim 1, wherein said brush members are made of copper alloys selected from the group including phosphor bronze and beryllium.

12. A brush and slip ring arrangement as claimed in claim 11, where each of said brush members comprises a semi-circular arm member extending around said slip rings.

13. A brush and slip ring arrangement as claimed in claim 1, wherein said brush holding unit comprises a brush holder, secured to said housing, for holding said brush members.

14. A brush and slip ring arrangement as claimed in claim 13, wherein said brush holder comprises a cylindrical member for accommodating said brush members and said slip ring unit therein around said shaft.

15. A brush and slip ring arrangement of an AC generator which includes a housing, a stator having a stator coil, a rotor having a shaft and a cooling fan, a field coil and a rotor core for rotating relative to said stator, said arrangement comprising:
    a slip ring unit carried by said shaft and having a cylindrical insulating member and a pair of carbonaceous slip rings held in said cylindrical insulating member, each of said carbonaceous slip rings being composed of a conductive body structure impregnated with carbon powder;
    a pair of brush members made of springy copper alloy disposed to slide on said carbonaceous slip rings;
    a brush holder unit fixed to said housing for holding said brush members; and
    a pair of connection bars electrically connecting said field coil and said carbonaceous slip rings, each of said connection bars having an insert member at one end thereof insert-molded with said conductive body structure of one of said carbonaceous slip rings, thereby ensuring both mechanical and electrical connection, wherein
    said cooling fan is made of insulating material, and
    said slip ring unit and said connection bars are disposed integrally with said cooling fan.

16. A brush and slip ring arrangement as claimed in claim 15, wherein
    said cooling fan comprises a first annular member for supporting said slip ring unit and said connection bars.

17. A brush and slip ring arrangement as claimed in claim 16, wherein
 said cooling fan further comprises a second annular member extending in the axial direction, and
 said brush holder further comprises a cylindrical extension extending axially toward said second annular member to enclose said slip ring unit and said brush members.

18. A brush and slip ring arrangement as claimed in claim 17, wherein
 said cylindrical extension has an annular groove to receive an end of said second annular member, thereby forming a labyrinth seal.

* * * * *